United States Patent
Ieda et al.

(10) Patent No.: US 8,382,170 B2
(45) Date of Patent: Feb. 26, 2013

(54) DOOR HANDLE DEVICE

(75) Inventors: Kiyokazu Ieda, Kariya (JP); Eiji Mushiake, Chita-gun (JP); Kai Nakamura, Kariya (JP); Tomoo Kakegawa, Toyota (JP); Junzo Ooe, Nishikamo-gun (JP); Hiroki Okada, Toyota (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 381 days.

(21) Appl. No.: 12/670,594

(22) PCT Filed: Jul. 25, 2008

(86) PCT No.: PCT/JP2008/063387
§ 371 (c)(1),
(2), (4) Date: Jan. 25, 2010

(87) PCT Pub. No.: WO2009/017047
PCT Pub. Date: Feb. 5, 2009

(65) Prior Publication Data
US 2010/0205780 A1    Aug. 19, 2010

(30) Foreign Application Priority Data
Jul. 27, 2007 (JP) ................................. 2007-196120

(51) Int. Cl.
*E05B 3/00* (2006.01)
*E05B 65/10* (2006.01)
(52) U.S. Cl. .................................... 292/336.3; 340/5.72
(58) Field of Classification Search ............... 292/336.3; 340/5.72
See application file for complete search history.

(56) References Cited

U.S. PATENT DOCUMENTS
6,577,228 B1   6/2003   Tsuchida et al.
7,132,768 B2   11/2006  Ieda et al.
(Continued)

FOREIGN PATENT DOCUMENTS
DE  10 2005 041 551 A1   3/2007
JP  2002-057564 A        2/2002
(Continued)

OTHER PUBLICATIONS

Search Report issued Mar. 10, 2011 by the European Patent Office in European Application No. 08791631.8.

(Continued)

*Primary Examiner* — Carlos Lugo
(74) *Attorney, Agent, or Firm* — Buchanan Ingersoll & Rooney, P.C.

(57) ABSTRACT

A door handle device for a vehicle is arranged in a door thereof. The door handle device includes a support member, door handle, lock detection electrode, and capacitance sensor. The door handle includes a first end, second end, pivot portion, and operation portion. A capacitance sensor detects issuance of a door lock command from a change in capacitance between an outer panel and lock detection electrode. The door handle includes a first handle case and second handle case covering the first handle case. The lock detection electrode is proximal to and faces an inner surface of at least one of an upper wall and lower wall of the second handle case. The lock detection includes an electrode end face facing the outer panel and formed to be non-planar.

18 Claims, 6 Drawing Sheets

U.S. PATENT DOCUMENTS

| | | |
|---|---|---|
| 7,233,080 B2 | 6/2007 | Garnault et al. |
| 7,984,938 B2 * | 7/2011 | Tanimoto et al. ......... 292/336.3 |
| 2002/0030594 A1 | 3/2002 | Inaba et al. |
| 2003/0009855 A1 | 1/2003 | Budzynski |
| 2003/0122556 A1 | 7/2003 | Sueyoshi et al. |
| 2005/0231364 A1 | 10/2005 | Nitawaki et al. |
| 2006/0143857 A1 | 7/2006 | Freyholdt et al. |
| 2006/0232378 A1 | 10/2006 | Ogino et al. |
| 2007/0096905 A1 | 5/2007 | Ieda et al. |
| 2007/0115191 A1 | 5/2007 | Hashiguchi et al. |
| 2007/0216174 A1 | 9/2007 | Tanimoto et al. |

FOREIGN PATENT DOCUMENTS

| | | |
|---|---|---|
| JP | 2003-221949 A | 8/2003 |
| JP | 3502848 B2 | 12/2003 |
| JP | 2004-169426 A | 6/2004 |
| JP | 2005-134178 A | 5/2005 |
| JP | 2007-142784 A | 6/2007 |
| JP | 2007-247219 A | 9/2007 |
| WO | WO 03/029049 A2 | 4/2003 |
| WO | WO 03/071067 A1 | 8/2003 |
| WO | WO 03/071068 A1 | 8/2003 |
| WO | WO 03/095776 A1 | 11/2003 |
| WO | WO 2006/069633 A1 | 7/2006 |
| WO | WO 2009/017048 A1 | 2/2009 |
| WO | WO 2009/017049 A1 | 2/2009 |

OTHER PUBLICATIONS

*English translation of International Preliminary Report on Patentability and Written Opinion issued by the International Bureau of WIPO on Feb. 24, 2010 in International Application No. PCT/JP2008/063387.

*International Search Report (PCT/ISA/210) issued on Oct. 14, 2008 by Japanese Patent Office as the International Searching Authority for International Application No. PCT/JP2008/063387.

Official Action issued by the U.S. Patent and Trademark Office on Nov. 18, 2011 in copending U.S. Appl. No. 12/670,583.

* cited by examiner

DOOR HANDLE DEVICE

TECHNICAL FIELD

The present invention relates to a door handle device implementing a function for detecting a lock command or the like for a vehicle door.

BACKGROUND ART

Figure 8:
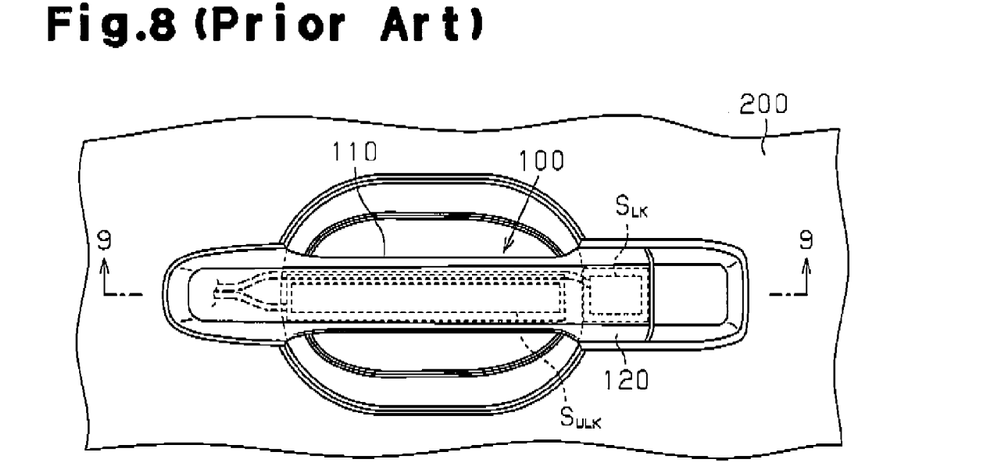
FIG. 8 is a front view showing a conventional door handle device.
Figure 9:
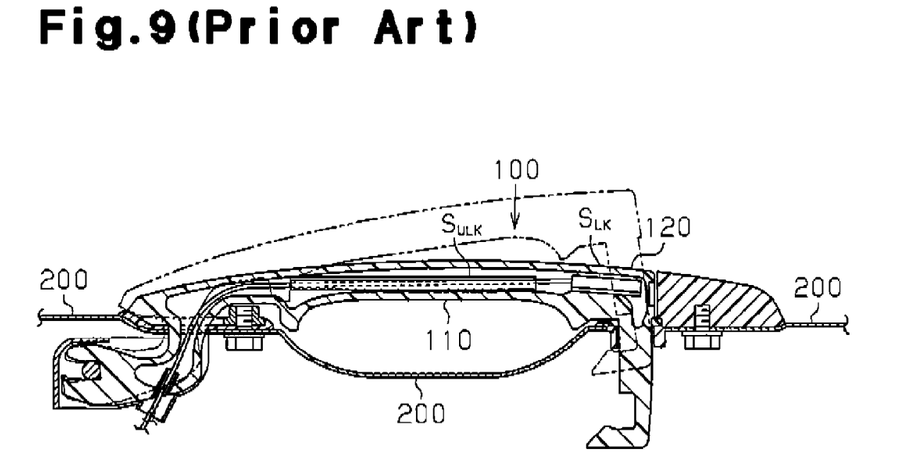
FIG. 9 is a cross-sectional view taken along line 9-9 in FIG. 8.

Nowadays, the so-called Smart Entry System (registered trademark) is used in door handle devices. In the Smart Entry System, communication is performed between a portable device, which is carried by a vehicle user, and a transceiver of a vehicle so as to, for example, recognize a vehicle user is approaching or leaving the vehicle user and detect a lock command and an unlock command generated by the vehicle user to automatically lock and unlock the vehicle door. Patent Document 1 describes an example of such a conventional door handle device. FIG. 8 shows the front structure of the door handle device described in patent document 1. FIG. 9 shows the cross-sectional structure taken along line 9-9 in FIG. 8.

As shown in FIGS. 8 and 9, the door handle device has a door handle 100 including an outer panel 200 of the vehicle door and a grip 110, which defines an area into which a vehicle user's hand is insertable. The grip 110 includes an unlock sensor $S_{ULK}$, which is for detecting an unlock command generated by the vehicle user. An operation unit, which is for operating an opening/closing mechanism of the vehicle door, extends into the door through the outer panel 200 from one end 120 of the door handle 100. The end 120 includes a lock sensor $S_{LK}$, which is for detecting a lock command generated by the vehicle user. The lock sensor $S_{LK}$ and the unlock sensor $S_{ULK}$ are each a capacitance sensor that detects changes in the capacitance and includes a detection electrode. The sensors $S_{LK}$ and $S_{ULK}$ each determine that the lock command or the unlock command has been issued when detecting a change in the capacitance that occurs when the vehicle user's hand approaches the corresponding detection electrode. For instance, when $C_{PANEL}$ represents a reference value for the capacitance between the outer panel 200 of the vehicle door and the detection electrode of the lock sensor $S_{LK}$, it is determined that the lock command has not been issued if the value of the capacitance detected by the lock sensor $S_{LK}$ does not greatly differ from the reference value $C_{PANEL}$. When the vehicle user's hand approaches the detection electrode, a new capacitance $C_T$, which is electrically connected in parallel to the capacitance $C_{PANEL}$, is formed between the detection electrode and the vehicle user's hand (synthesized capacitance $C_{PANEL}+C_T$). Since the value of the synthesized capacitance is greater than the reference value $C_{PANEL}$ by an amount corresponding to the capacitance $C_T$, it is determined that a lock command has been issued. This detection principle is applied in the same manner to the unlock sensor $S_{ULK}$. In the door handle device of patent document 1, the lock sensor $S_{LK}$ and the unlock sensor $S_{ULK}$ are arranged at different parts of the door handle 100. The lock command and the unlock command are thus distinguished from each other by the vehicle user touching these different parts of the door handle 100.

As shown in FIG. 8, the door handle device of patent document 1 includes a lock detection electrode (lock sensor $S_{LK}$) arranged in an area (area facing away from the outer panel 200) of the end of the grip 110 closer to the outer surface. Thus, when the vehicle user inserts his or her hand between the grip 110 and the outer panel 200 to perform an unlock operation and pulls the door handle 100 to open the door, the hand is apt to entering the detection range of the lock sensor $S_{LK}$. In such a case, accurate detections may be hindered since the detection of the unlock command by the unlock sensor $S_{ULK}$ and the detection of the lock command by the lock sensor $S_{LK}$ are simultaneously performed. Further, when the door is open, the vehicle user may perform unintentional operations such as the lock operation if the vehicle user's hand enters the detection range of the lock sensor $S_{LK}$.

[Patent Document 1] Japanese Patent No. 3502848

SUMMARY OF THE INVENTION

It is an object of the present invention to provide a door handle device that avoids unintentional operations when the vehicle user locks the door.

To achieve the above object, one aspect of the present invention provides a door handle device arranged in a door of a vehicle and capable of operating a door opening/closing mechanism of the vehicle. The door handle device includes a support member arranged at an inner side of an outer panel of the door. A door handle is arranged on an outer side of the outer panel and includes a first end, a second end, a pivot portion extending through the outer panel from the first end and pivotally supported by the support member, and an operation portion extending through the outer panel from the second end so as to be capable of operating the opening/closing mechanism. A lock detection electrode is arranged on the door handle and capacitance-coupled to the outer panel. A capacitance sensor is connected to the lock detection electrode, which detects issuance of a door lock command based on a change in a capacitance between the outer panel and the lock detection electrode. The door handle includes a first handle case, which has a grip arranged to define a gap with an outer surface of the outer panel, and a second handle case, which covers the first handle case so as to form an outer portion of the door handle. The second handle case includes an upper wall and a lower wall, which face toward each other. The lock detection electrode is arranged proximal to and facing toward an inner surface of at least one of the upper wall and lower wall. The lock detection includes an electrode end face facing toward the outer panel, and the electrode end face is formed to be non-planar.

BRIEF DESCRIPTION OF THE DRAWINGS

FIG. 7($a$) is a perspective view showing a further example of a lock detection electrode having an undulated electrode end face, FIG. 7($b$) is a perspective view showing a further example of a lock detection electrode having a triangular-waved electrode end face, and FIG. 7($c$) is a perspective view showing a further example of a lock detection electrode having a sawtoothed electrode end face;

DETAILED DESCRIPTION OF THE PREFERRED EMBODIMENTS

One embodiment of a door handle device according to the present invention implementing the Smart Entry System (registered trademark) will now be discussed with reference to FIGS. 1 to 5.

Figure 1:
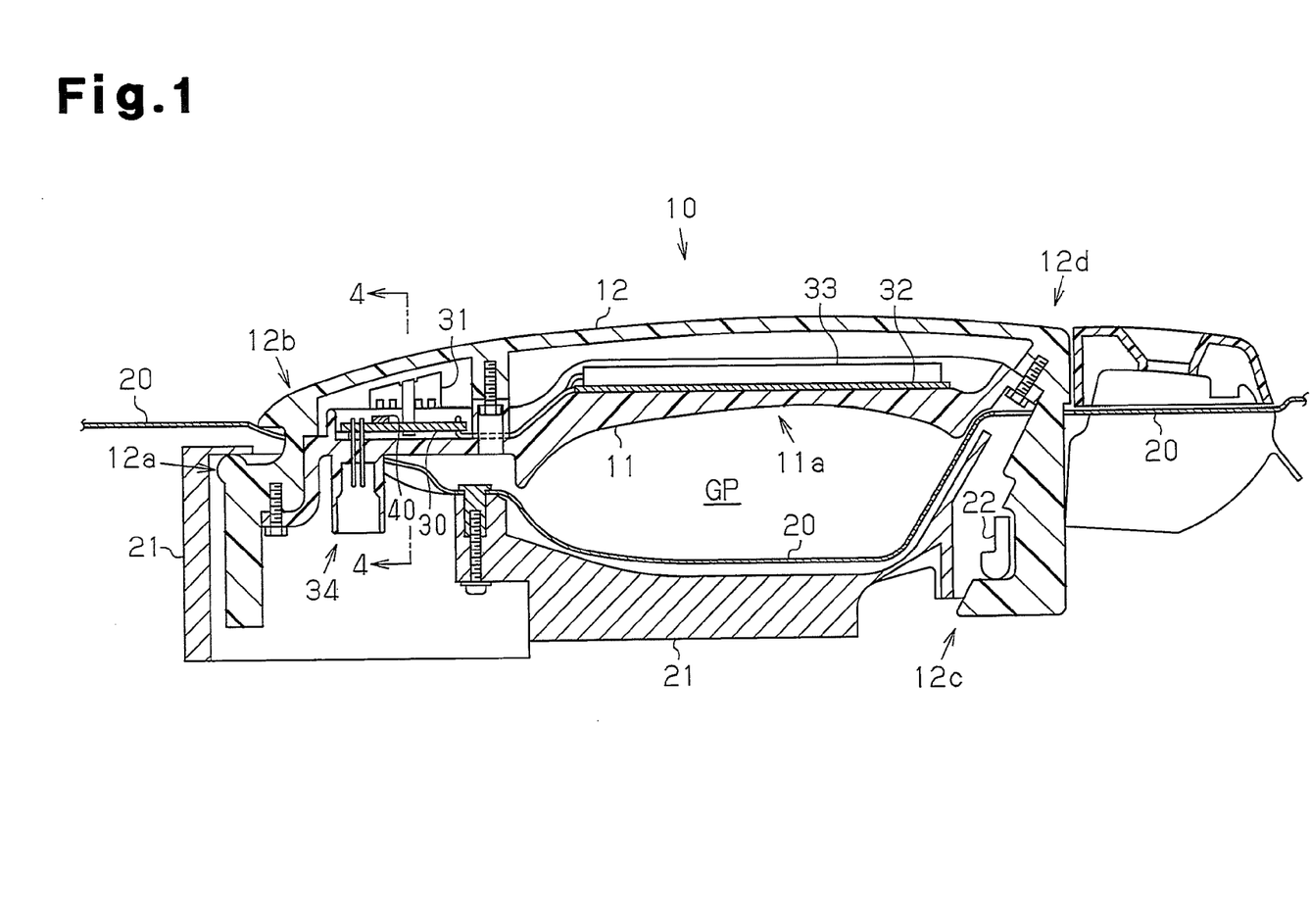
FIG. 1 is a cross-sectional view of a door handle device according to one embodiment of the present invention.

As shown in FIG. 1, a door handle device, which is capable of operating a door opening/closing mechanism of a vehicle, has a door handle 10 including a case, which is formed by a first handle case 11 and a second handle case 12. The first handle case 11 includes a grip 11a, which is gripped by a vehicle user. A gap GP is defined between the grip 11a and an outer surface of an outer panel 20 of the vehicle door. The second handle case 12 is fastened to the first handle case 11 by screws or the like to cover the first handle case 11 and form an outer portion of the door handle 10. In this manner, the case of the door handle 10 is formed by two segments (11 and 12). Thus, the door handle 10 has a high degree of freedom and convenience for design and manufacturing. The first handle case 11 and the second handle case 12 are both formed from a highly rigid resin material.

A support member 21 and a lever 22 of the door opening/closing mechanism are arranged in the outer panel 20. The second handle case 12 includes a first end 12b, which serves as a first portion, and a second end 12d, which serves as a second portion located opposite to the first end 12b with the grip 11a arranged in between. The support member 21 pivotally supports a pivot portion 12a, which extends from the first end 12b through the outer panel 20 and into the interior of the outer panel 20. An operation portion 12c, which is for operating the lever 22, extends from the second end 12d through the outer panel 20 and into the interior of the outer panel 20. When the vehicle user holds the grip 11a and pulls the door handle 10, the door handle 10 pivots about the first end 12b in a direction that moves out the second end 12d. This operates the lever 22 with the operation portion 12c and opens the vehicle door as long as the vehicle door is not in a locked state.

Figure 2:
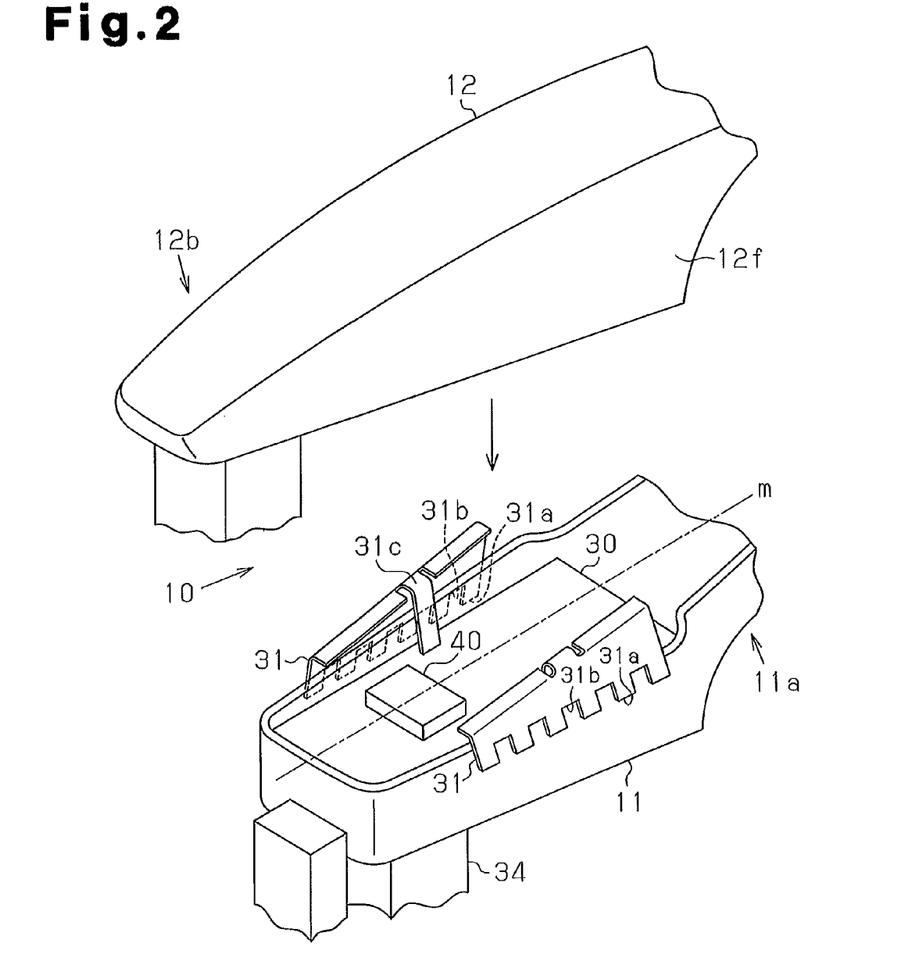
FIG. 2 is a perspective view showing an exploded structure of a portion from a first end to a grip of the door handle device of FIG. 1.

In the first handle case 11, a circuit substrate 30, on which various types of electronic components are mounted, is arranged between the grip 11a and the first end 12b. Referring to FIG. 4, the interior of the handle case 11 is filled with a flexible resin 90 (e.g., polyurethane, silicon etc.) so that the circuit substrate 30 is fixed to the case 11 and kept impervious to water due to the resin 90. The resin 90 is shown only in FIG. 4. A pair of lock detection electrodes 31 is mounted on the circuit substrate 30. The lock detection electrodes 31 are connected to a capacitance sensor 41, which detects the issuance of a door lock command of the vehicle door based on changes in the capacitance. As shown in FIGS. 2 and 4, each lock detection electrode 31 faces the inner surface of the second handle case 12, more specifically, the inner surfaces of the upper and lower walls 12e and 12f of the second handle case 12 and is arranged between the grip 11a and the first end 12b. The upward and downward directions as viewed in FIG. 4 correspond to the upward and downward directions of the vehicle. In the present embodiment, the lock detection electrodes 31 are located proximate to, or in contact with, the inner surfaces of the upper and lower walls 12e and 12f, respectively. A capacitance sensor 42 has an unlock detection electrode 32 electrically connected to a specific electrode that serves as a sensor input terminal arranged on the circuit substrate 30. The unlock detection electrode 32 detects the issuance of a door unlock command of the vehicle door based on changes in the capacitance. The unlock detection electrode 32 is arranged in the grip 11a. An antenna 33 is arranged in the grip 11a. Necessary information such as user authentication is exchanged between the antenna 33 and a portable device (not shown), which is carried by the vehicle user. The antenna 33 is electrically connected to a specific electrode that serves as a power supply terminal arranged on the circuit substrate 30. A sensor IC 40 including the capacitance sensors 41 and 42 is mounted on the circuit substrate 30. The supply of power to the sensor IC 40, the antenna 33, and the like, and the retrieval of the necessary information, such as output signals from the sensor IC 40, by a door control unit 60 (see FIG. 3) are performed through a connector 34, which is arranged on the rear surface of the circuit substrate 30.

The structure of the lock detection electrode 31 will now be discussed in detail with reference to FIG. 2.

The lock detection electrodes 31 are arranged in symmetry with respect to a center line m extending in the longitudinal direction of the door handle 10 from the first end 12b towards the second end 12d along the middle of the space between the upper and lower walls 12e and 12f. Each lock detection electrode 31 includes an end (electrode end) facing toward the outer panel 20, namely, an electrode end face 31a, formed to be meandered, that is, comb-toothed (or rectangular-waved). Further, each lock detection electrode 31 includes a connecting portion 31c serving as a supporting portion in the longitudinally central part of the lock detection electrode 31. As shown in FIG. 4, the connecting portion 31c is connected to the circuit substrate 30 so as to extend through the circuit substrate 30. This supports the lock detection electrode 31 on the circuit substrate 30.

Figure 3:
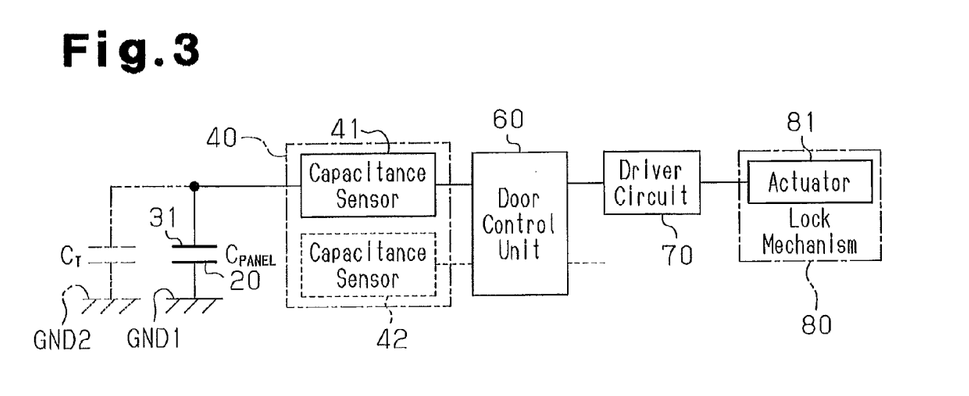
FIG. 3 is a block diagram mainly showing the structure of a door lock system in the door handle device of FIG. 1.
Figure 4:
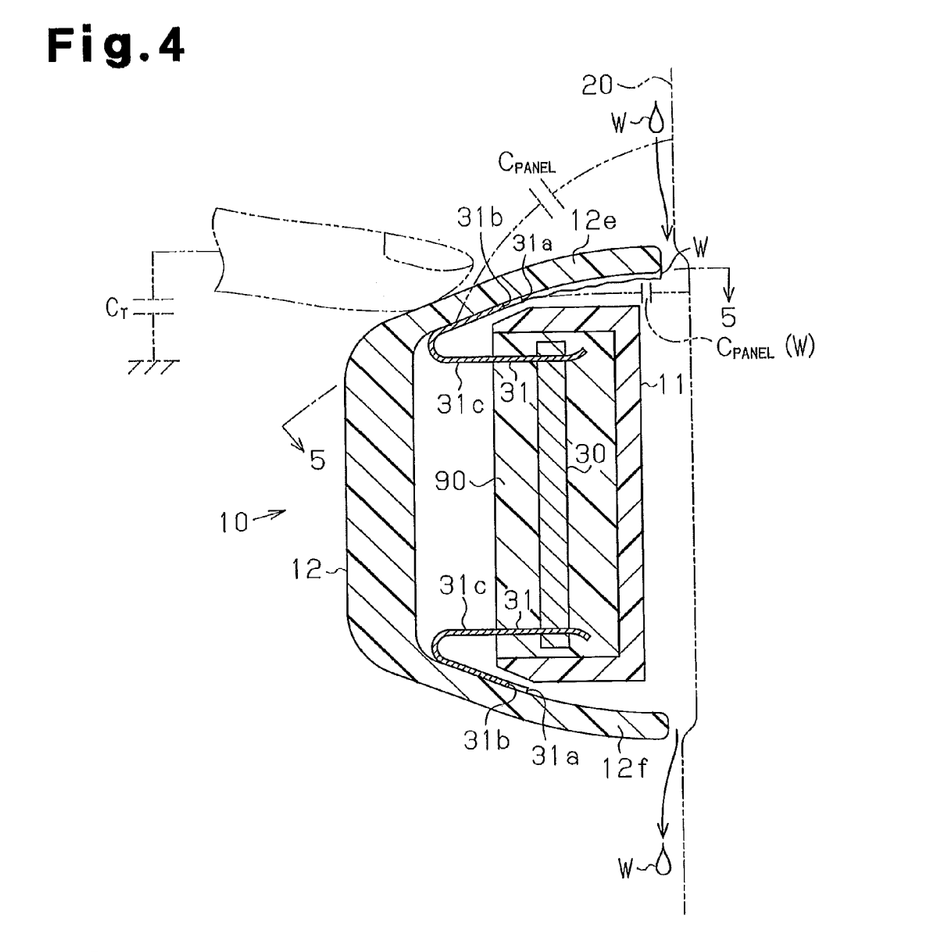
FIG. 4 is a cross-sectional view taken along line 4-4 in FIG. 1.

FIG. 3 is an equivalent circuit mainly showing a door lock system in the door handle device and illustrated as a block diagram. The detection principle of the door lock and operational procedures related to the door lock will now be discussed with reference to FIG. 3.

In FIG. 3, ground GND1 represents the outer panel 20. As shown in FIG. 3, the outer panel 20 and the lock detection electrodes 31 (specifically, the electrode end faces 31a) are capacitance-coupled to form a capacitance $C_{PANEL}$ therebetween. The capacitance sensor 41 retrieves the value of the capacitance $C_{PANEL}$ via the lock detection electrodes 31. The vehicle user may touch with his or her hand a portion of the second handle case 12 facing the lock detection electrodes 31. In FIG. 3, ground GND2 represents the vehicle user. In this case, the vehicle user and the lock detection electrode 31 are capacitance-coupled so as to form a capacitance $C_T$ in between. The capacitance $C_T$ and the capacitance $C_{PANEL}$ are in an electrically parallel relationship. The capacitance sensor 41 retrieves the value indicating the synthesized capacitance ($C_{PANEL}+C_T$). The capacitance sensor 41 detects issuance of the door lock command when the value of the synthesized capacitance is greater than the capacitance $C_{PANEL}$ by an amount corresponding to the capacitance $C_T$. As a result, the door control unit 60 determines that a door lock command has been issued by the vehicle user based on the detection signal of the capacitance sensor 41. The door control unit 60 then drives a lock actuator 81 arranged in a lock mechanism 80 via a driver circuit 70 to lock the vehicle door. The same detection principle and operational procedures are applied to an unlock system that unlocks the vehicle door through cooperation between the unlock detection electrode 32 and the capacitance sensor 42. As described above, the lock detection electrodes 31 are arranged facing toward the inner surfaces of the upper and lower walls 12e and 12f of the second handle case 12. This solves the problem of the door lock command being issued when the vehicle user performs door handle gripping in a normal manner. Thus, erroneous door lock operations performed by the vehicle user are prevented.

The significance for forming the electrode end face 31a of each lock detection electrode 31 to be comb-toothed (or rectangular-waved) in the above-described door handle device will now be described. Referring to FIG. 4, to enlarge the detection range of each lock detection electrode 31, it is desirable that the gap between the electrode end face 31a and the outer panel be small. However, when the gap between the electrode end face 31a and the outer panel 20 is small, there would be a tendency of raindrops W being guided into the gap between the electrode end face 31a and the outer panel 20. Particularly, the electrode end face 31a is exposed to the exterior from between the first and second handle cases 11 and 12. Thus, the raindrops W may move to the proximity of or come into contact with the lock detection electrode 31. When the raindrops W move to the proximity of or come into contact with the lock detection electrode 31, as the permittivity of a dielectric rises, the capacitance increases by an amount corresponding to a capacitance $C_{PANEL}(W)$ especially at closest opposing portions of the capacitance-coupled detection electrode 31 and outer panel 20 at which the distance between the two is the shortest. This increases the influence of the increased capacitance $C_{PANEL}(W)$ on the capacitance $C_{PANEL}$ between the detection electrode 31 and the outer panel 20. In this case, the capacitance sensor 41 may function erroneously as if a door lock command has been issued.

Figure 5:
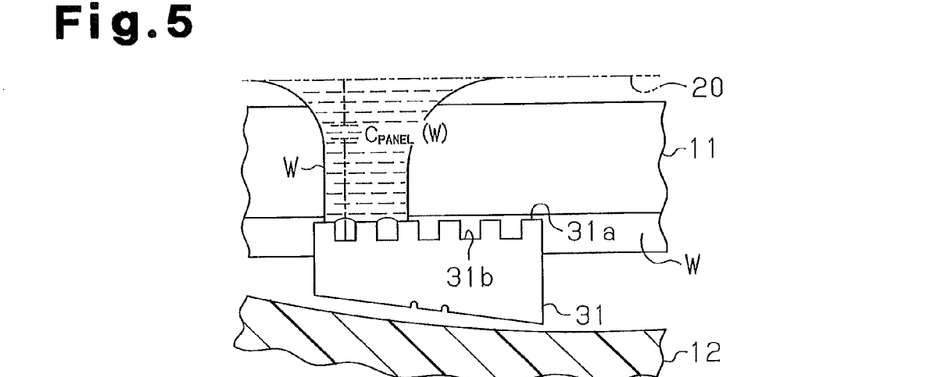
FIG. 5 is a cross-sectional view taken along line 5-5 in FIG. 4.

In the door hand device of the present embodiment, the electrode end face 31a of each lock detection electrode 31 is formed to be meandered, that is comb-toothed (or rectangular-waved). Thus, as shown in FIG. 5, when raindrops W move into between the electrode end face 31a and the outer panel 20, cutout portions 31b of the electrode end face 31a are spaced from the raindrops W. As a result, the connection of the electrode end face 31a and the outer panel 20 through the raindrops W or the like is easily cut. This suppresses increases in the capacitance $C_{PANEL}$ when raindrops W are in the proximity of or come into contact with the lock detection electrode 31. Thus, changes in the permittivity resulting from infiltrating raindrops W and consequently changes in the capacitance are suppressed. This prevents erroneous operations of the capacitance sensors 41 and 42 caused by such infiltrating raindrops W in a desirable manner. A pressing machine or the like may be used to easily form the meandered shape of the electrode end face 31a.

The door handle of the present embodiment has the advantages described below.

(1) The lock detection electrodes 31 are arranged on the inner surfaces of the upper and lower walls 12e and 12f in the second handle case 12. This solves the problem of the door lock command being issued when the vehicle user performs door handle gripping in a normal manner. Further, the electrode end face 31a is formed to be meandered (comb-shaped or rectangular-waved), that is, non-planar. This avoids contact between raindrops W, which move into between the electrode end face 31a and the outer panel 20, and raindrops W and thereby easily cuts the connection of the electrode end face 31a and the outer panel 20 through the raindrops W. Thus, erroneous operations of the capacitance sensors 41 and 42 caused by raindrops W are suppressed in a desirable manner. Such an advantage is obtained not only when there are raindrops W, which result from a rainfall, but is also obtained when there are, for example, water droplets or the like resulting from a car wash or the like.

(2) The electrode end faces 31a are comb-toothed (rectangular-waved). Thus, the electrode end faces 31a may easily be formed through pressing.

(3) The two lock detection electrodes 31 are arranged in symmetry with respect to the center line m, which extends from the first end 12b to the second end 12d. In other words, the two lock detection electrodes 31 are arranged to be symmetric in the vertical direction when the door handle is attached to the vehicle door. This normalizes the door handle device and allows for versatile use. Specifically, the door handle device is versatile and basically has the same structure regardless of whether it is used for any door of a vehicle, such as the right door, the left door, and the rear doors.

(4) The unlock detection electrode 32 of the vehicle door is arranged in the grip 11a of the door handle. Thus, the door unlock command is issued when the vehicle user holds and operates the door handle to open the vehicle door. This distinguishes a door lock command from a door unlock command in a desirable manner. In other words, the capacitance sensor 41 and 42 more accurately detect whether the vehicle user intends to lock or unlock the vehicle door.

The above-described embodiment may also be modified and practiced as discussed below.

Figure 6:
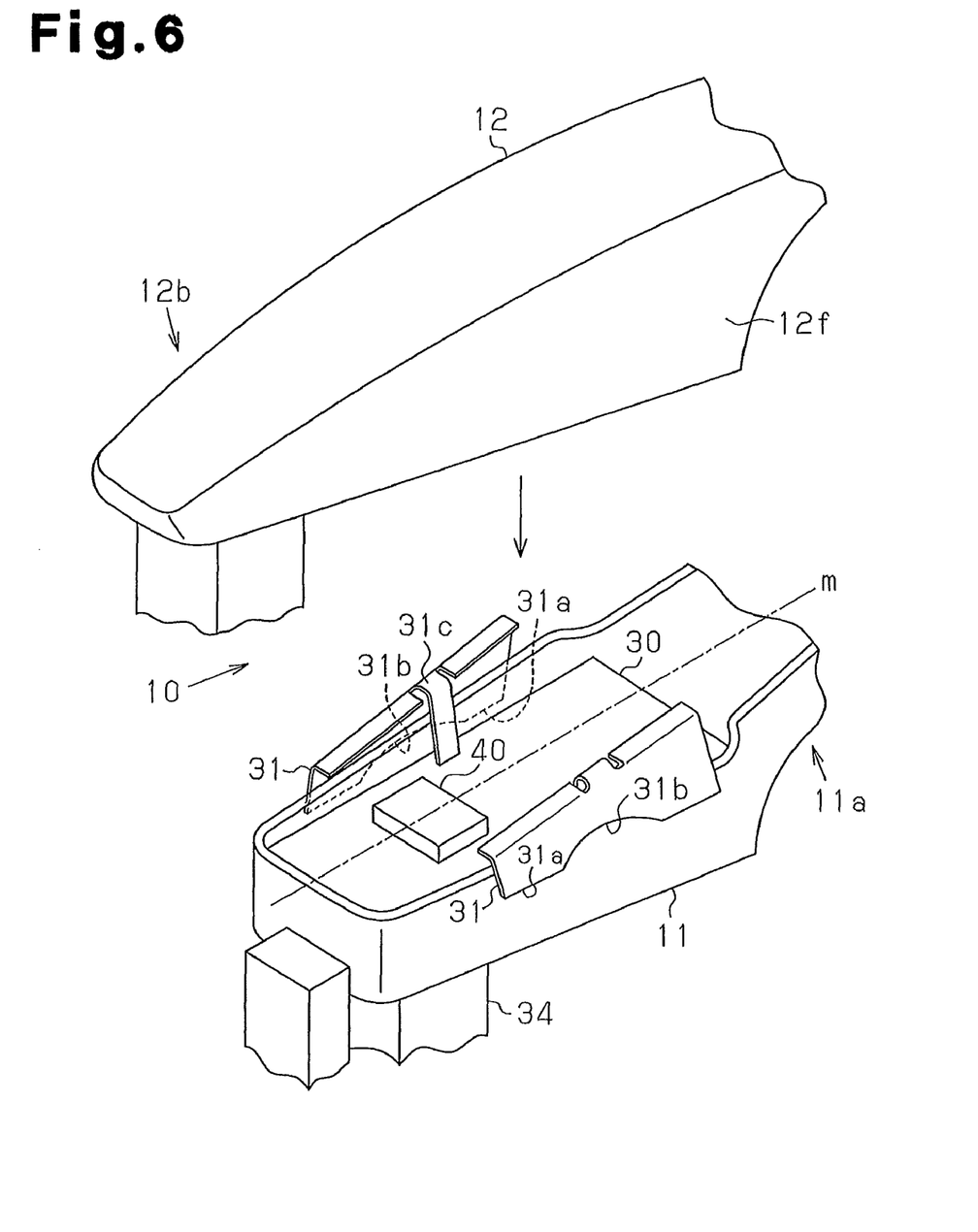
FIG. 6 is an exploded perspective view showing the structure of another example of the door handle device according to the present invention.
Figure 7A:
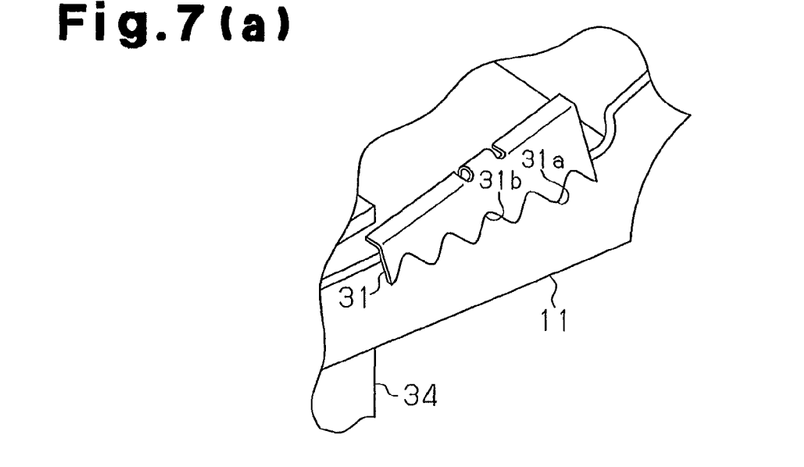
Figure 7B:
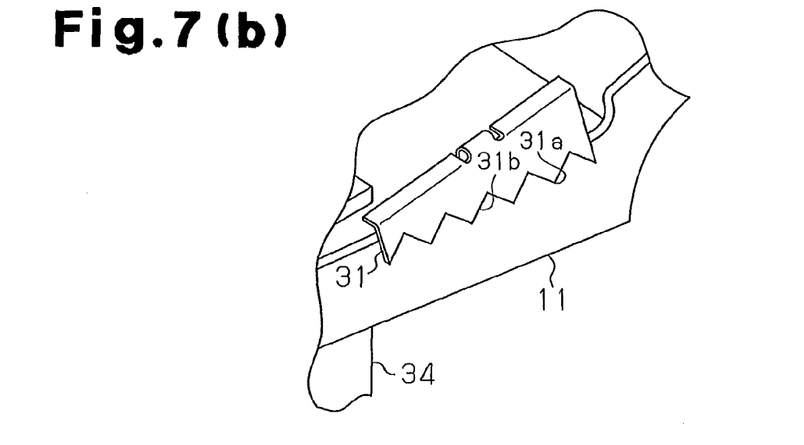
Figure 7C:
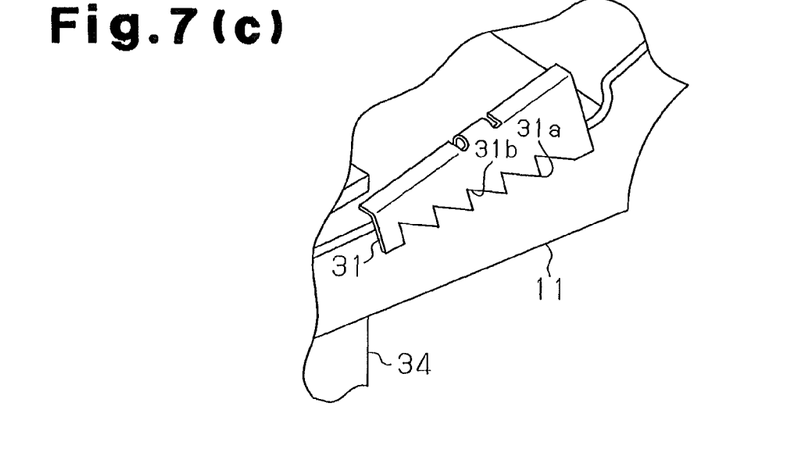

In the above-described embodiment, the electrode end faces 31a are formed to be comb-toothed (rectangular-waved). However, the electrode end faces 31a may be formed to have other non-planar shapes. For example, as shown in FIG. 6, the electrode end faces 31a may be formed to be inwardly curved (arcuate). The arcuate electrode end face 31a would also be easy to form through pressing. Alternatively, the electrode end faces 31a may be formed into various types of shapes so as to be undulated, triangular-waved, or saw-toothed, as respectively shown in FIGS. 7(a) to 7(c).

The lock detection electrodes 31 do not necessarily have to be arranged in vertical symmetry. For example, if the lock detection electrode is a single electrode, the lock detection electrode may be arranged at a position facing toward the inner surface of either the upper wall or the lower wall of the door handle in a state in which the door handle is attached to the vehicle as long as it is arranged between the grip and the first end of the door handle.

In the above-described embodiment, the first end 12b and the second end 12d are arranged in the second handle case 12. Instead, at least either one of the first end 12b and the second end 12d may be arranged in the first handle case 11.

The invention claimed is:

1. A door handle device arranged in a door of a vehicle and capable of operating a door opening/closing mechanism of the vehicle, the door handle device comprising:
   a support member arranged at an inner side of an outer panel of the door;
   a door handle arranged on an outer side of the outer panel and including a first end, a second end, a pivot portion extending through the outer panel from the first end and pivotally supported by the support member, and an operation portion extending through the outer panel from the second end so as to be capable of operating the opening/closing mechanism, wherein the door handle includes a first handle case, which has a grip arranged to define a gap with an outer surface of the outer panel, and a second handle case, which covers the first handle case so as to form an outer portion of the door handle, with the second handle case including an upper wall and a lower wall, which face toward each other;

a lock detection electrode arranged on the door handle and capacitance-coupled to the outer panel;

a first capacitance sensor connected to the lock detection electrode, which detects issuance of a door lock command based on a change in a capacitance between the outer panel and the lock detection electrode;

an unlock detection electrode arranged in the grip so as to be capacitance-coupled to the outer panel; and a second capacitance sensor connected to the unlock detection electrode, which detects issuance of an unlock command based on a change in a capacitance between the outer panel and the unlock detection electrode;

wherein the lock detection electrode is arranged proximal to and facing toward an inner surface of at least one of the upper wall and lower wall, the lock detection electrode includes an electrode end face facing toward the outer panel, the electrode end face is formed to have at least one cutout portion for preventing a connection between the electrode end face and the outer panel through water droplets, which move into and between the electrode end face and the outer panel, and the lock detection electrode is arranged between the grip and the first end.

2. The door handle device according to claim 1, wherein the electrode end face is formed to be serpentine.

3. The door handle device according to claim 1, wherein the electrode end face is formed to be comb-toothed, rectangular-waved, triangular-waved, sawtoothed, or undulated.

4. The door handle device according to claim 1, wherein the electrode end face is inwardly curved.

5. The door handle device according to claim 1, wherein the lock detection electrode includes two electrodes arranged in symmetry with respect to a center line extending from the first end to the second end along the middle of the space between the upper wall and the lower wall.

6. The door handle device according to claim 1, wherein the lock detection electrode contacts the inner surface of at least one of the upper wall and the lower wall.

7. The door handle device according to claim 1, wherein the electrode end face is exposed to the exterior of the door handle from between the first handle case and second handle case.

8. The door handle device according to claim 1, further comprising:

a circuit substrate arranged between the first handle case and the second handle case, wherein the lock detection electrode is supported by the circuit substrate.

9. The door handle device according to claim 8, wherein the lock detection electrode is supported by the circuit substrate.

10. A door handle device for use with a vehicle including a door having an opening/closing mechanism and a door panel having inner and outer sides, the door handle device comprising:

a support member mountable at the inner side of the outer panel of the door;

a door handle mountable on the outer side of the outer panel and including a first end, a second end, a pivot portion extending through the outer panel from the first end and pivotally supported by the support member, and an operation portion extendable through the outer panel from the second end so as to be capable of operating the opening/closing mechanism, wherein the door handle includes a first handle case, which has a grip arranged to define a gap with an outer surface of the outer panel, and a second handle case, which covers the first handle case so as to form an outer portion of the door handle, with the second handle case including an upper wall and a lower wall, which face toward each other;

a lock detection electrode arranged on the door handle and capacitance-coupled to the outer panel;

a first capacitance sensor connected to the lock detection electrode, which detects issuance of a door lock command based on a change in a capacitance between the outer panel and the lock detection electrode;

an unlock detection electrode arranged in the grip so as to be capacitance-coupled to the outer panel; and a second capacitance sensor connected to the unlock detection electrode, which detects issuance of an unlock command based on a change in a capacitance between the outer panel and the unlock detection electrode;

wherein the lock detection electrode is arranged proximal to and facing toward an inner surface of at least one of the upper wall and lower wall, the lock detection electrode includes an electrode end face facing toward the outer panel, the electrode end face is formed to have at least one cutout portion for preventing a connection between the electrode end face and the outer panel through water droplets, which move into and between the electrode end face and the outer panel, and the lock detection electrode is arranged between the grip and the first end.

11. The door handle device according to claim 10, wherein the electrode end face is formed to be serpentine.

12. The door handle device according to claim 11, wherein the electrode end face is formed to be comb-toothed, rectangular-waved, triangular-waved, sawtoothed, or undulated.

13. The door handle device according to claim 11 wherein the electrode end face is inwardly curved.

14. The door handle device according to claim 11, wherein the lock detection electrode includes two electrodes arranged in symmetry with respect to a center line extending from the first end to the second end along the middle of the space between the upper wall and the lower wall.

15. The door handle device according to claim 11, wherein the lock detection electrode contacts the inner surface of at least one of the upper wall and the lower wall.

16. The door handle device according to claim 11, wherein the electrode end face is exposed to the exterior of the door handle from between the first handle case and second handle case.

17. The door handle device according to claim 11, further comprising:

a circuit substrate arranged between the first handle case and the second handle case, wherein the lock detection electrode is supported by the circuit substrate.

18. The door handle device according to claim 17, wherein the lock detection electrode is supported by the circuit substrate.

* * * * *